United States Patent
Wymore

(10) Patent No.: US 10,272,841 B1
(45) Date of Patent: Apr. 30, 2019

(54) SIDE STEP FOR MOTOR VEHICLE

(71) Applicant: Iddea California, LLC, Brea, CA (US)

(72) Inventor: Timothy J. Wymore, Brea, CA (US)

(73) Assignee: Iddea California, LLC, Brea, CA (US)

(*) Notice: Subject to any disclaimer, the term of this patent is extended or adjusted under 35 U.S.C. 154(b) by 0 days.

(21) Appl. No.: 16/001,621

(22) Filed: Jun. 6, 2018

Related U.S. Application Data

(63) Continuation of application No. 15/795,743, filed on Oct. 27, 2017, now Pat. No. 10,011,231.

(51) Int. Cl.
*B60R 3/00* (2006.01)

(52) U.S. Cl.
CPC .................... *B60R 3/002* (2013.01)

(58) Field of Classification Search
CPC ....................................................... B60R 3/002
See application file for complete search history.

(56) References Cited

U.S. PATENT DOCUMENTS

| | | |
|---|---|---|
| 5,823,553 A * | 10/1998 | Thompson ............ B60R 3/002 280/164.1 |
| D545,747 S | 7/2007 | Storer |
| D546,745 S | 7/2007 | Storer |
| D568,222 S | 5/2008 | Storer |
| 7,731,212 B2 | 6/2010 | Storer |
| D671,874 S | 12/2012 | Kekich, Jr. |
| 8,448,967 B2 | 5/2013 | Storer |
| D717,708 S | 11/2014 | Romero |
| 9,156,406 B2 | 10/2015 | Stanesic |
| 9,511,716 B2 | 12/2016 | Montoya |
| 9,809,172 B2 * | 11/2017 | Stanesic ............... B60R 3/002 |
| 2009/0072507 A1 | 3/2009 | Storer |

* cited by examiner

*Primary Examiner* — James A Shriver, II
*Assistant Examiner* — James J Triggs
(74) *Attorney, Agent, or Firm* — Stetina Brunda Garred and Brucker

(57) ABSTRACT

A motor vehicle side step has a running board with a slot in its back side through which bolts extend to clamp an insert and a base of a vehicle mounting bracket to the running board. A tubular top frame extends around the outer side of top step plate and has opposing ends fastened to the running board with the top step plate fastened to the running board and top frame member to form a top step. A second step support frame has two connector plates that bolt to a bottom side of the running board through slots in that bottom side. The second step support frame extends outward and downward from the connector plates to provide a lower support to which a lower step plate is fastened to form a lower step. A top step support extends upward from the second step support frame and connects to the bottom of the top step plate.

13 Claims, 9 Drawing Sheets

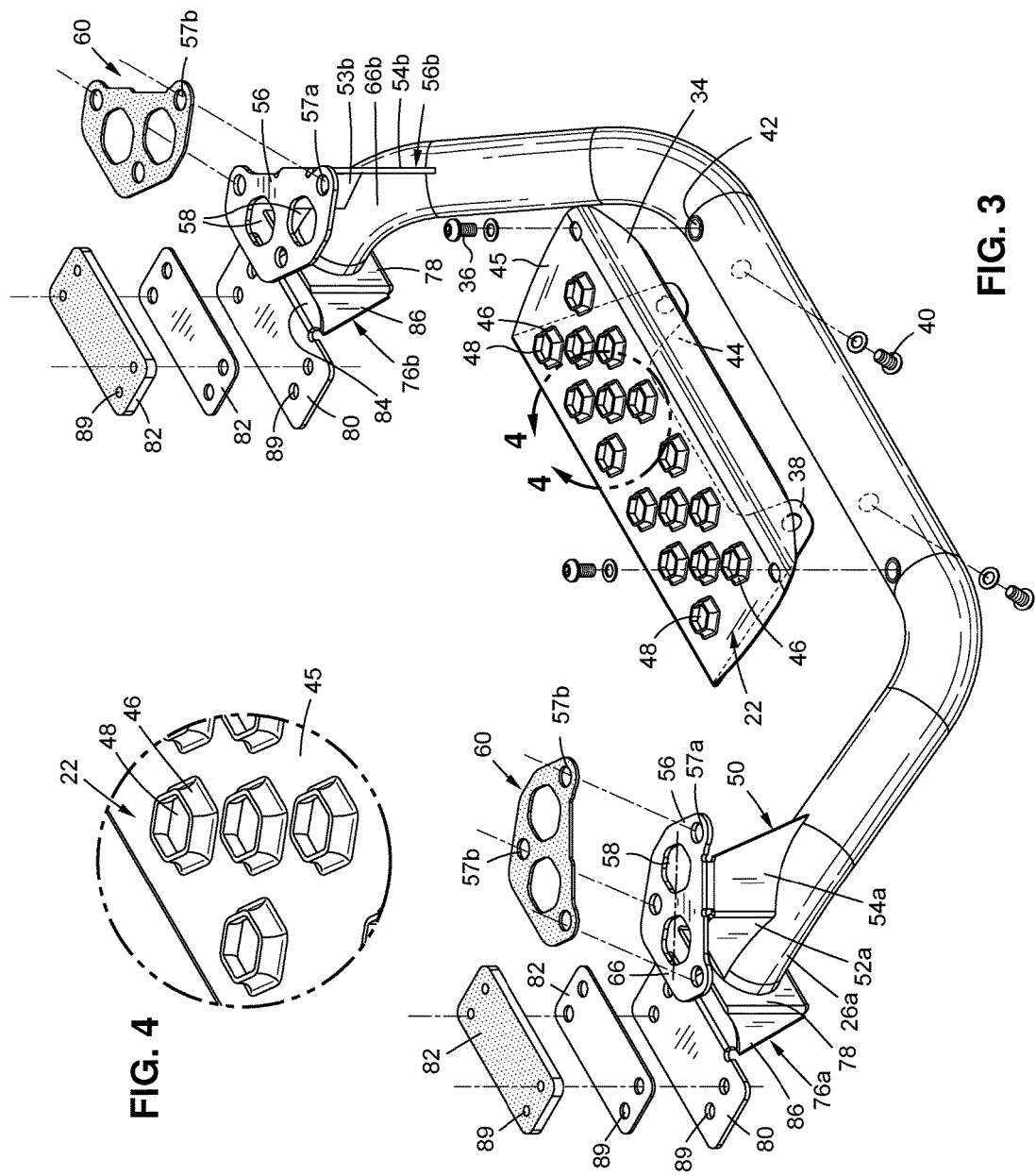

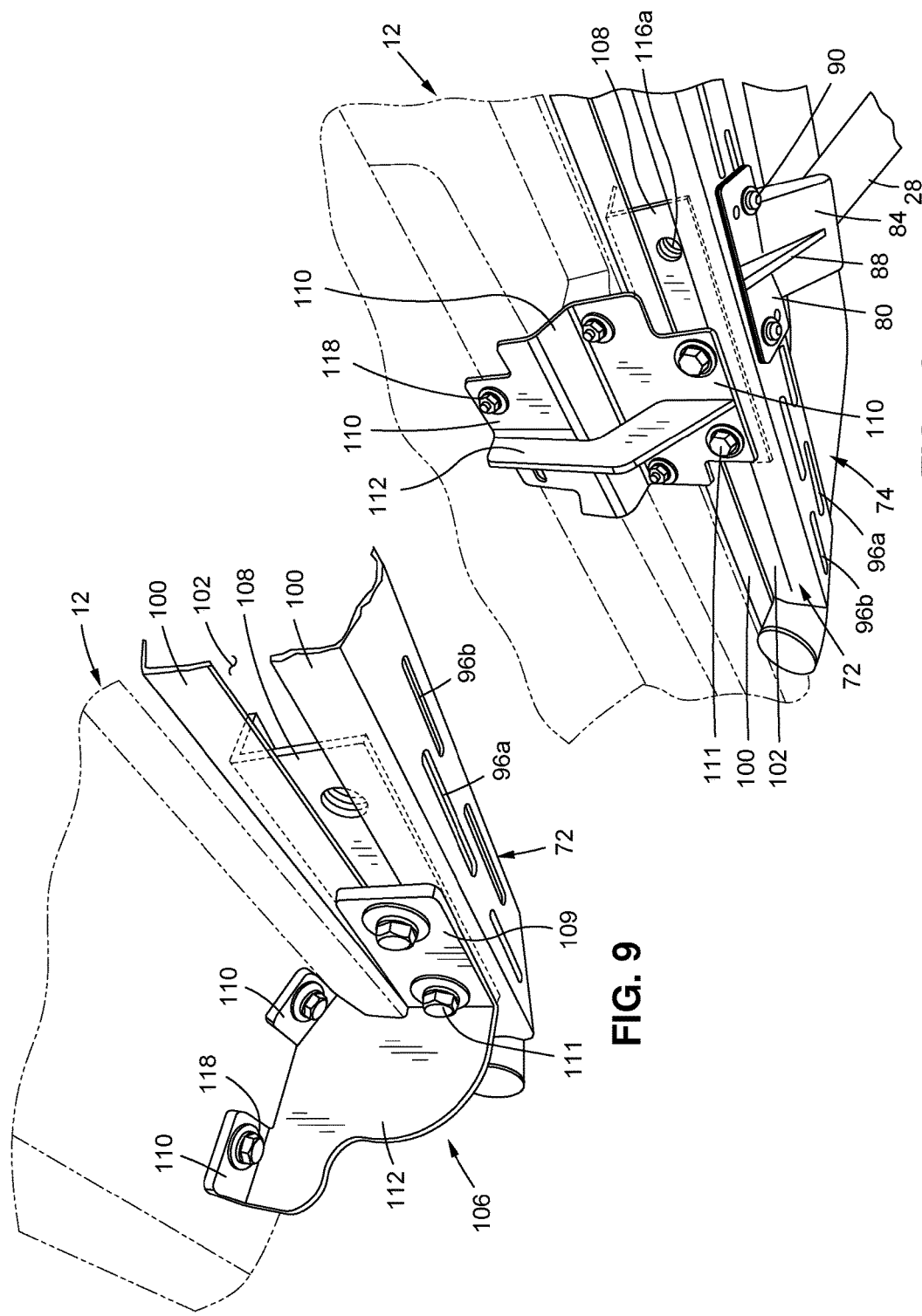

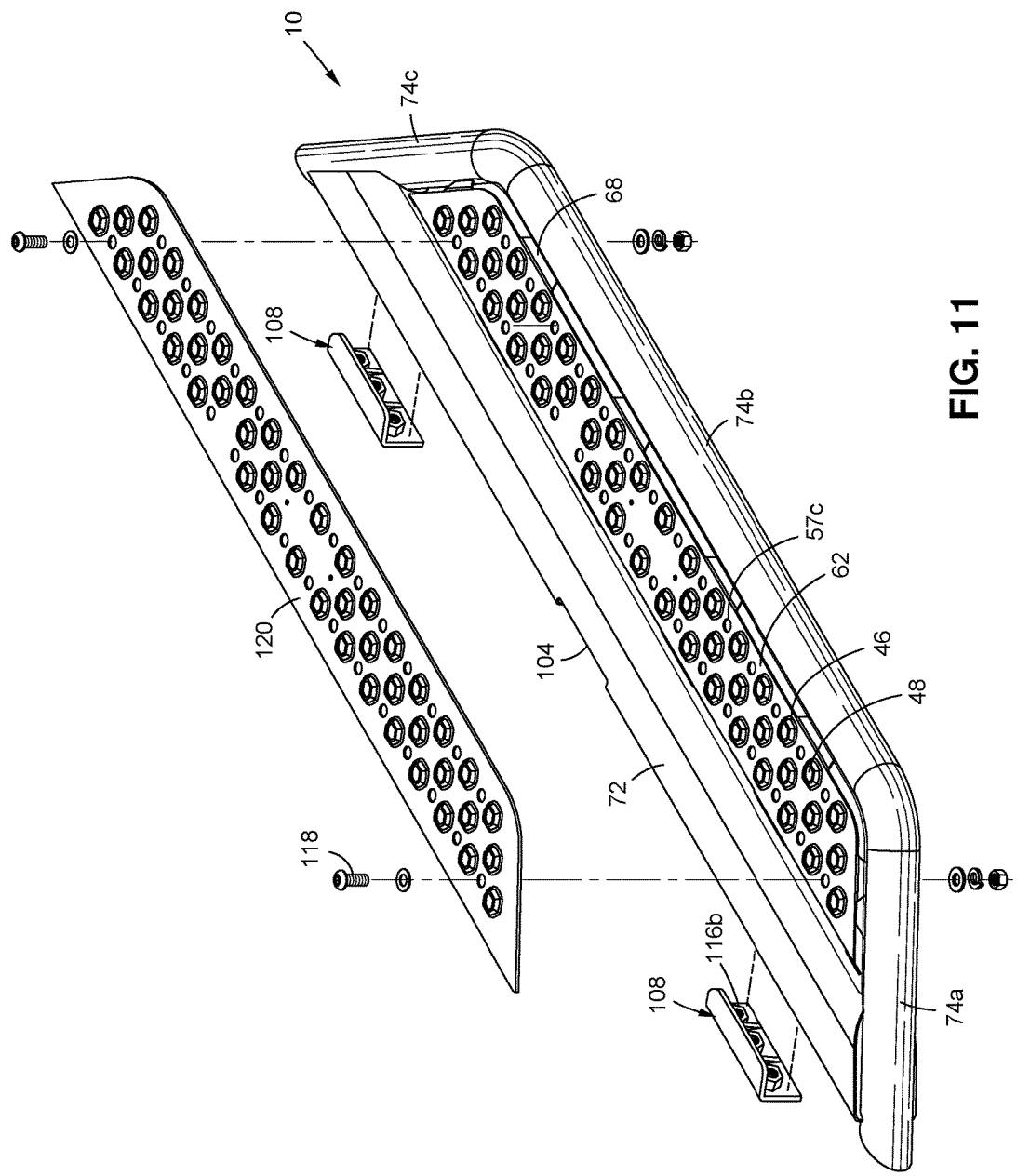

SIDE STEP FOR MOTOR VEHICLE

CROSS-REFERENCE TO RELATED APPLICATIONS

The present application is a continuation patent application of U.S. patent application Ser. No. 15/795,743 filed on Oct. 27, 2017, the entire contents of which are incorporated herein by reference.

STATEMENT RE: FEDERALLY SPONSORED RESEARCH/DEVELOPMENT

Not applicable.

BACKGROUND

Motor vehicles often have cabs raised far enough from the ground that entering the cab through the vehicle's door is not possible in a single step. For example, pickup trucks may have shocks and springs raising the vehicle bodies above the standard chassis Some motor vehicles raising the body far enough from the ground that even the addition of a step adjacent the vehicle's door to the vehicle cab is insufficient to allow easy entry to the motor vehicle's cab. There is thus a need for a side step for attachment to a motor vehicle, and preferably for a side step having two steps to make it easier to enter a vehicle cap located further above the ground than is comfortable for a person entering the cab.

If the vehicle's cab is located a sufficiently large distance from the ground or of a user has restricted capability to take vertical steps, then multiple steps are desirable. But prior art steps may have complex deployment mechanisms or require vehicle modification for installation and use. There is thus a need for multi-step side steps that are simple to make and install.

The nature of vehicles which locate the cab far enough from the ground to require a step to enter the vehicle is that mud, viscous materials and other debris often stick to the shoes of those entering the vehicle. There is thus a need for a way to remove undesirable materials from the shoes of a person entering the vehicle. There is a further need to remove undesirable materials from such shoes while avoiding the accumulation of such materials on any side step for the vehicle.

Side steps are typically fastened to the frame of a motor vehicle. Holes can be drilled in the vehicle frame or body to conform to the mounting brackets of a side step, but doing so requires time and labor which increase expense and also risk damaging the vehicle. Some vehicles have pre-formed mounting locations, but these differ in location and form among vehicles and also differ among vehicle manufactures. Thus, a variety of mounting brackets are needed to connect to a variety of vehicles. But even this presents difficulties because the distance between mounting locations also varies so that a variety of side steps with different lengths must also be maintained for use with a variety of vehicles. There is thus a need for an improved method and apparatus for connecting side steps to motor vehicles that provide fast and easy connections, while reducing the number of different lengths of side steps and connecting parts.

BRIEF SUMMARY

A motor vehicle side step is provided that has a running board with a back slot in its back side through which bolts extend to clamp an insert and a base of a vehicle mounting bracket to the running board. The vehicle mounting bracket mounts to the vehicle. By moving the base and insert along the back slot, a user can position the mounting bracket and more easily position the bracket relative to the running board and thus adjust position of the running board relative to the vehicle. A tubular top frame extends around the outer side of top step plate and has opposing ends fastened to the running board with the top step plate fastened to the running board and top frame member to form a top step. An optional second step support frame has two connector plates that bolt to a bottom side of the running board through slots in that bottom side. The slots allow adjustable positioning of the second step support frame relative to the running board, and one or more second steps can be provided. The second step support frame extends outward and downward from the connector plates to provide a lower support to which a lower step plate is fastened to form a lower step. A top step support extends upward from the second step support frame and connects to the bottom of the top step plate to provide additional connections with the top step and with the vehicle.

There is also provided a side step for a motor vehicle having a frame and vehicle body. The side step has an elongated, tubular running board extending along a first axis and having a bottom side with a first and second plurality of closed ended, elongated slots with longitudinal axes parallel to the first axes. The first plurality of slots are closer to the vehicle during use than the second plurality of slots. The running board has a back side facing the vehicle during use, and also has two elongated back slots each extending along a longitudinal axis parallel to the first axis. The side step also has a tubular side step member having a front and rear end connected to respective front and rear ends of the running board. The side step member has a middle portion joining the front and rear ends of the side step member in the same general plane as the running board. A top step plate is connected to the running board and the middle portion of the side step member in the same general plane as the running board. The side step connects to the vehicle using first and second vehicle mounting brackets each having a vehicle connecting plate located to releasably fasten to the vehicle body or frame. The vehicle mounting brackets each have a base connected by a threaded fastener to an insert located inside the running board. Each threaded fastener extends through a different one of the back slots and clamps the insert and base to the running board.

In further variations, this side step may include a second step having a lower step plate located below the top step plate in a generally horizontal plane. The lower step plate is connected to a generally U-shaped, lower support frame having two, generally horizontal connector plates connected to the bottom side of the running board by threaded fasteners passing through different ones of the first and second plurality of slots. The second step further has two top step supports, each extending upward from the lower support frame at a location adjacent one of the connector plates, with each top step support bolted to the bottom of the top step plate.

In a more detailed variation, there is advantageously provided a side step for a motor vehicle having a frame and vehicle body adjacent the ground The side step may include a metal running board extending along a first longitudinal axis. The running board may have a front end and an opposing rear end and also have a bottom side facing downward toward the ground during use. The bottom side advantageously has first and second parallel rows of elongated, closed ended bottom slots, with each bottom slot extending along an axis parallel to the first axis. The bottom slots in the first row are preferably staggered with respect to the bottom slots in the second row. The running board also has an elongated back side with a back slot parallel to the first axis and extending along a length of the back side. The side step also has a tubular, metal, side step member having a middle portion parallel to the first axis, a front portion connected to the front end of the running board, and a rear end connected to the rear end of the running board. A top step plate preferably extends between and is connected to the running board and the middle portion of the tubular side step member on opposing sides of the top step plate. The top step plate is preferably located close enough to a top of the side step member to form a step for a person's foot during use.

In further variations of the side step, the top step plate has first and second rows of dimples with each row parallel to the first axis. Each row may also have fastener holes between a majority of the dimples in each row. Advantageously, the first row of dimples and fastener holes are closer to the running board than the second row. The dimples are preferably hexagonal in shape. The top step plate preferably has a plurality of outwardly extending tabs along opposing sides of the top step plate, with the plurality of tabs also extending downward to connect to one of the running board and the middle portion of the side step member. The In further variations, the side step has first and second inserts, each located inside the running board and movable along a portion of a length the running board. First and second vehicle mounting brackets connect to the inserts. Each bracket may have at least one vehicle connecting plate with a fastener hole therethrough, a base with at least one fastener hole passing therethrough, and a middle portion connecting the base to the vehicle connecting plate. A plurality of first threaded fasteners pass through the back slot and connect the first base to the first insert. A plurality of second threaded fasteners pass through the back slot and connect the second base to the second insert. The first and second vehicle connecting plates are configured to fasten and preferably do fasten to a motor vehicle, preferably by fastening to an underside of the vehicle body or to the vehicle's frame.

In still further variations, the side step also includes a lower step, having a lower step support frame having first and second connector plates each having both first and second fastener holes therethrough located to align with respective first and second rows of the bottom slots. The connector plates are orientated to connect to the bottom side of the running board during use. Different ones of a third plurality of threaded fasteners pass through the first and second rows of bottom slots and first and second fastener holes in the first and second connector plates to fasten the connector plates to the bottom side of the running board. A lower step support frame has a first and second proximal ends connected to the first and second connector plates, respectively, with each proximal end connected to an opposing end of a bottom step support located a predetermined distance outward from the and below the connector plates during use. A lower step plate having opposing first and second sides has the first side connected to a first, upper portion of the lower step support and the second side connected to a second, lower portion of the lower step support. First and second top step supports are each connected to a respective one of the first and second proximal ends, with the top step supports located above the connector plates during use, in a generally horizontal plane. A fourth plurality of threaded fasteners is provided, different ones of which pass through one of the fastener holes in the top step plate and a corresponding fastener hole in one of the first and second top step supports to connect the top step supports to the bottom of the top step plate.

The side step may also have a lower step that includes a lower step support frame having first and second connector plates each having both first and second fastener holes therethrough located to align with respective first and second rows of closed ended, bottom slots. The connector plates are preferably horizontal during use and orientated to abut the bottom side of the running plate during use. A plurality of threaded fasteners each pass through a different one of the bottom slots in one of the first and second rows of bottom slots to connect the first and second connector plates to the bottom side of the running board. A lower step support frame has first and second proximal ends connected to the first and second connector plates, respectively, with each proximal end connected to an opposing end of a bottom step support located a predetermined distance outward from the and below the connector plates during use. A lower, horizontal step plate is connected to the lower step support. First and second top step supports are connected to the first and second proximal ends, respectively, and located above the connector plates during use, in a generally horizontal plane, with each of the first and second step supports connected to a bottom of the top step plate.

In still further variations of the above side steps, a vertical spacer is interposed between each of the first and second connector plates and the bottom side of the running board. The dimples may be hexagonal in shape and define hexagonal openings. Preferably, each top step support comprises three fastener holes sized and located to align with three fastener holes in the top step plate. Each top step support may comprise and two hexagonal openings sized and located to align with two dimples on the top plate, with each hexagonal opening in each top step support being centered on a line between two fastener holes in the top step support, which two fastener holes are aligned with fastener holes in the first and second rows so threaded fasteners pass through the aligned fastener holes to connect the top step support to the bottom side of the running board.

In still further variations of the above side steps, the back slot comprises first and second, closed ended back slots, each extending from adjacent an enlarged opening in the back plate toward a different end of the back plate. The dimples may be hexagonal in shape and define hexagonal openings about half an inch between flats. Advantageously, a plurality of the bottom slots are about 2 to about 4 inches long.

In a further embodiment, the side step for a motor vehicle has a metal running board extending along a first longitudinal axis, the running board having a front end and an opposing rear end and further having a bottom side facing downward toward the ground during use. The bottom side may have first and second parallel rows of elongated, closed ended, bottom slots, each bottom slot extending along an axis parallel to the first axis. The bottom slots in the first row are preferably staggered with respect to the bottom slots in the second row. The running board has a back side with an enlarged opening through the back side, with first and second, closed ended back slots each parallel to the first axis and extending from adjacent the enlarged opening toward an opposing end of the back side. The side step also includes a tubular, metal, side step member having a middle portion parallel to the first axis and a front portion connected to the front end of the running board and having a rear end connected to the rear end of the running board. A top step plate extends between and is connected to the running board and the middle portion of the tubular side step member on opposing sides of the top step plate. The top step plate is located close enough to a top of the side step member to form a step for a person's foot during use. The top step plate may have first and second rows of dimples with each row parallel to the first axis, each row also having first fastener holes between the dimples in each row.

This further embodiment preferably also has first and second inserts, each located inside the running board and sized to pass through either the enlarged opening or one of the first and second back slots. The further embodiment also has first and second vehicle mounting brackets each having at least one vehicle connecting plate with a fastener hole therethrough, and a base connected to a respective one of the first and second inserts using threaded fasteners passing through one of the first and second back slots, each vehicle mounting bracket further having a middle portion connecting the base to the vehicle connecting plate.

In further variations, this further embodiment has a lower step support frame having first and second connector plates each connected to the bottom of the running board by threaded fasteners passing through the bottom slots in the running board. A lower step support frame having first and second proximal ends is connected to the first and second connector plates, respectively, with each proximal end connected to an opposing end of a bottom step support located a predetermined distance outward from the and below the connector plates during use. A lower, horizontal step plate may be connected to the lower step support. First and second top step supports connect to the first and second proximal ends, respectively, and are located above the connector plates during use, in a generally horizontal plane, so each of the first and second step supports is connected to a bottom of the top step plate. In still further variations, threaded fasteners pass through different ones of the first fastener holes in the top step plate connect the first and second top step supports to the top step plate.

The bottom slots cooperate with the connector plates and fasteners to allow the lower support frame to be fastened at a variety of locations along the length of the running board. That allows one or more lower steps to be fastened at various locations of the running board. The back slots allow threaded fasteners to clamp part of the running board between the inserts and the base of the vehicle mounting bracket at a variety of locations along the length of the back slot(s) so support the running board at a variety of locations along a length of the running board, allows the running board to be positioned along a length of the side of the vehicle, and allows the vehicle mounting brackets to be easily connected to the vehicle and to the running board.

BRIEF DESCRIPTION OF THE DRAWINGS

These and other advantages and features of the invention will be better appreciated in view of the following drawings and descriptions in which like numbers refer to like parts throughout, and in which:

FIG. 3 is a detailed exploded perspective view of a bottom step of the side step for a motor vehicle as shown in FIGS. 1-2;

FIG. 4 is an enlarged portion of a step, taken from 4-4 of FIG. 3;

FIG. 9 is a perspective view of a first vehicle mounting bracket connecting the top step of FIG. 6 to a motor vehicle;

FIG. 10 is a perspective view of a second vehicle mounting bracket connecting the top step of FIG. 6 to a motor vehicle;

FIG. 11 is an exploded perspective view showing a top cover for the top step of FIG. 6 with inserts for a vehicle mounting bracket;

DETAILED DESCRIPTION

Figure 1:
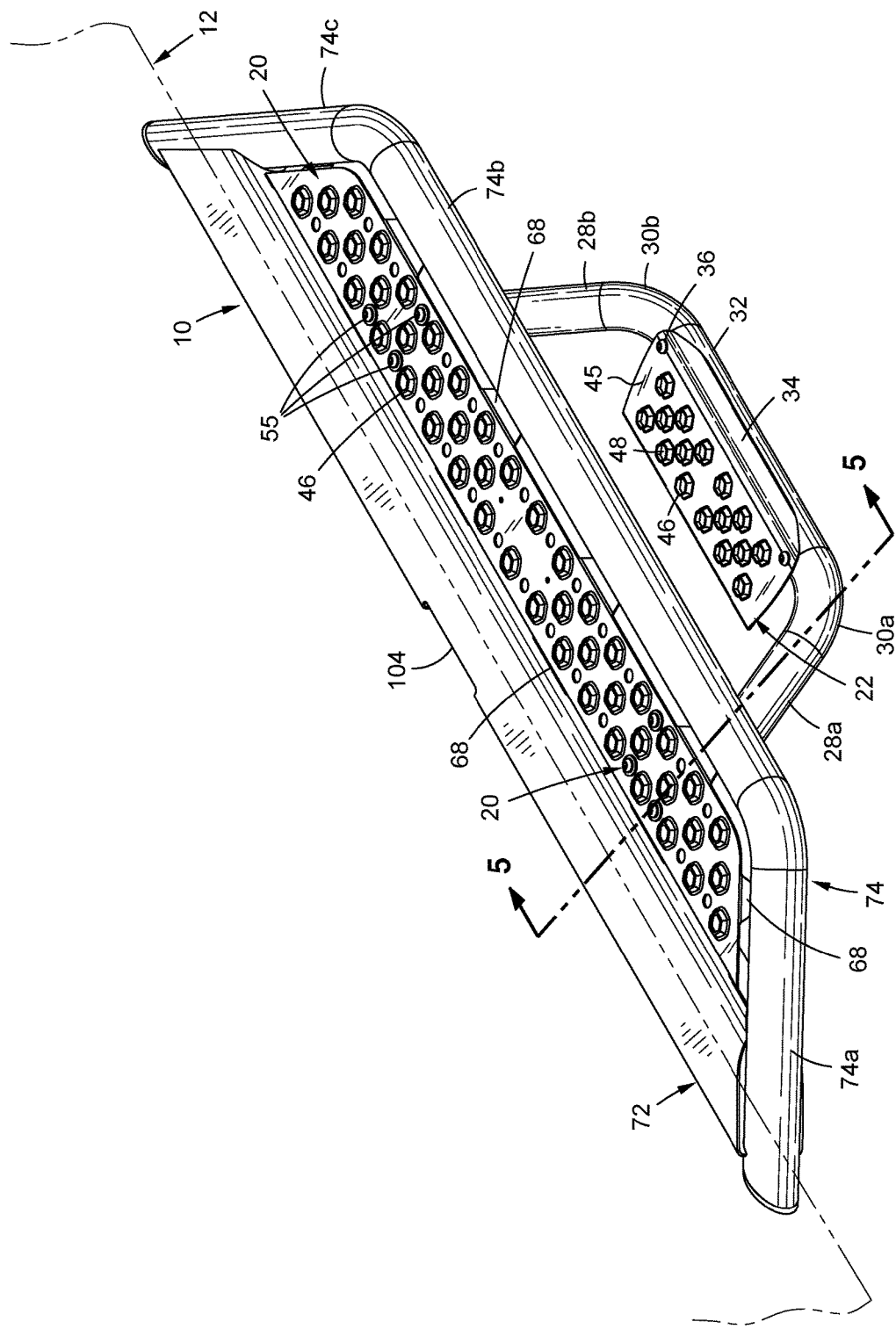
FIG. 1 is a perspective view of a side step for a motor vehicle with a portion of a motor vehicle shown.

As used herein, the following parts numbers generally refer to the following parts. 10—side step; 12—motor vehicle; 20—first step 22—second step; 24—support frame; 26*a, b*—proximal end; 28*a, b*—middle portion; 30*a, b*—bottom corner portion; 32—bottom step support; 34—outer side of second step; 36—fastener; 38—bottom step bracket; 40—lower portion of bottom step; 42—threaded hole; 44—cutout; 45—bottom step plate; 46—dimples; 48—openings; 50—top step bracket; 52—proximal end of bracket 50; 53—gusset; 54—distal end of bracket 50; 55—fastener; 56*a,b*—top step support; 57*a, b, c*—fastener holes; 58—openings in step support; 60—gasket; 62—top step plate; 64—peripheral edge of top plate; 66*a, b*—axis through openings 58; 68—connecting tab; 72—running board; 74—side step member; 74*a,b,c*—front, side, rear portion; 76*a,b*—proximal end connectors; 78—back wall; 80—connector plate; 82—gasket or spacer; 84—inclined front wall; 86—triangular side walls; 88—gusset; 89—holes in connector plate 80 and spacer 82; 90—threaded fastener; 92—nuts; 96—slots; 98—fasteners; 100—back side of running board; 102—back slot in the back of running board; 103—vertical support; 104—back opening; 106—vehicle mounting bracket; 108—insert; 109—base; 110—vehicle connecting plate; 111—fasteners; 112—middle portion; 116*a*—threaded holes in insert 108; 116*b*—threaded holes in base 109; 118—fastener; 120—protective cover plate.

Referring to FIGS. 1-5, a side step 10 is provided for a motor vehicle 12 (FIG. 1). As used herein, the relative directions up and down, above and below, top and, upper and lower are with respect to the vertical axis and the ground. In FIGS. 1-5, the up direction is toward the top of the page and down is the opposite direction. The ground is in a generally horizontal plane, perpendicular to the vertical axis in normal usage and as shown in the Figures. The relative directions inward and outward, inner and outer, proximal and distal refer to directions in the horizontal plane relative to the side of the motor vehicle to which the side step 10 connects during use, with inward and proximal being closest to the vehicle and outward or outer being further away from the vehicle—all as measured in a horizontal plane. The relative terms front, rear, forward and rearward, are with respect to the direction a driver faces when behind the vehicle's steering wheel, with front being the direction the driver faces and is to the left in FIGS. 1-4.

The side step 10 has a first, generally horizontal step 20 and an optional second step, 24, each connected to the vehicle 12 during use. The first step 20 is an upper step located above the second, bottom step 22. A tubular support frame 24 (FIG. 2) supports the first step 20 as described herein.

The support frame 24 has a generally U-shape that extends downward, with generally horizontal ends 26a, 26b. The support frame resembles the shape of bicycle handle bars with the ends of the horizontal handlebars adjacent the vehicle. The support frame 24 has two upper, proximal ends 26a, 26b, one at each opposing end of the support frame 24 and extending generally horizontally at their proximal end and curving downward and inclined toward each other at their outer portion. The support frame 24 advantageously has a straight downward middle portion 28a, 28b extending from the outer portion of the respective upper, proximal end 26a, 26b in a downward direction and inclined toward the other middle portion. Respective bottom corner portions 30a, 30b curve downward and then directly toward the opposing corner portion to connect one of the downwardly extending middle portions 28a, 28b to opposing ends of a second, bottom step support 32. The step support 32 is generally parallel to the side of the vehicle 12 (FIG. 1) in a generally horizontal plane when the vehicle is on level ground. The bottom step support 32 forms the bottom of the generally U-shaped support frame 24 and is connected to the second, bottom step 22. Each proximal end 26a, 26b and bottom corners 30a, 30b are preferably curved but oriented in different directions to form the support frame 24 shown in the Figures.

The second, bottom step 22 has an outer edge 34 which is preferably curved over and contacting the top, outer side of the bottom step support 32, with the remainder of the bottom step 22 extending horizontally inward toward the vehicle 12. Advantageously, but optionally, bottom step fasteners 36, such as removable threaded fasteners, may pass through the bottom step 22 and the bottom step support 32 to fasten the step 22 to the support 32 along the side 34.

Figure 5:
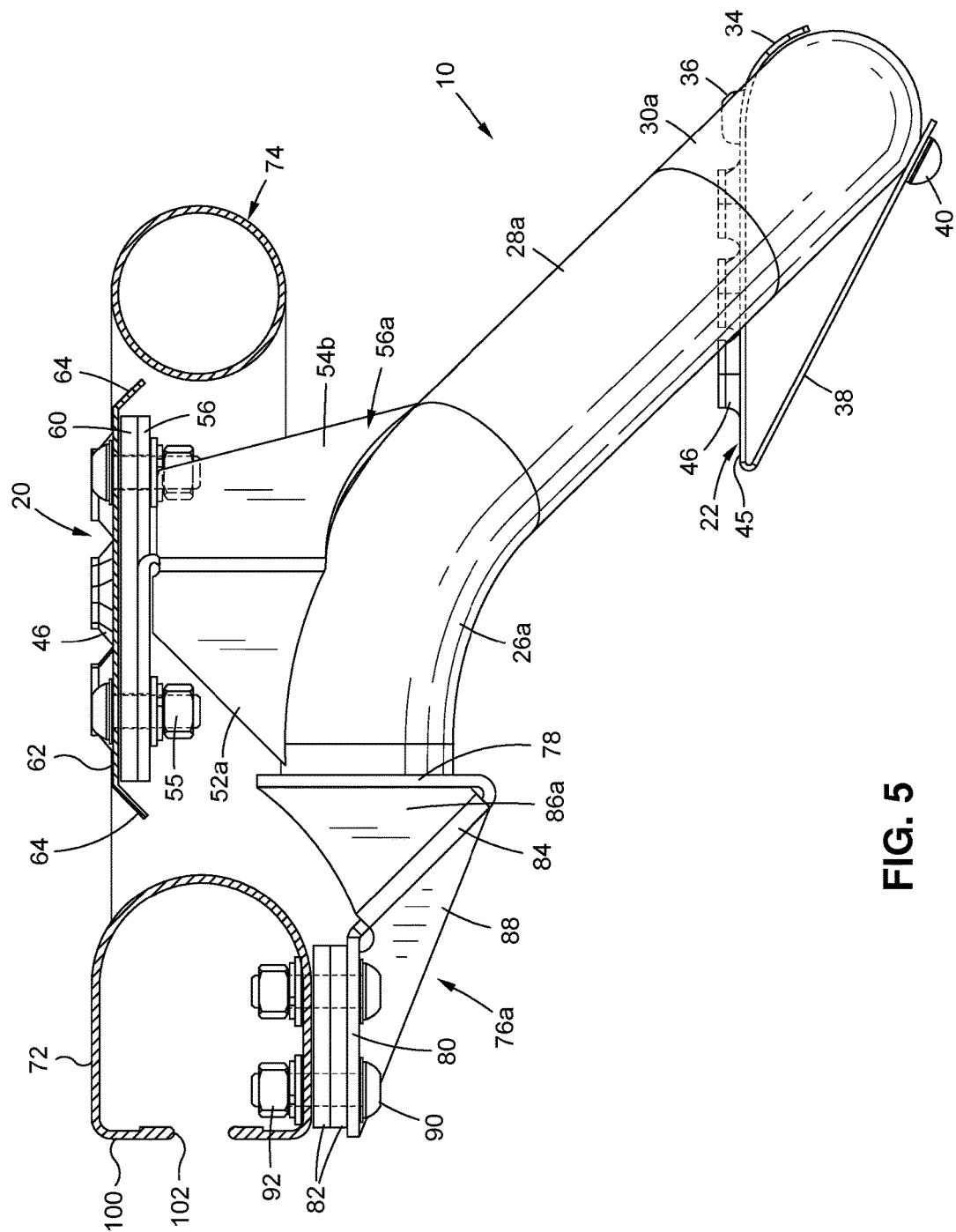
FIG. 5 is sectional side view taken along section 5-5 of FIG. 1.

At least one bottom step bracket 38 (FIG. 5) may connect the bottom step 22 to the bottom step support 24. Advantageously, as best seen in FIG. 5, the bottom step bracket 38 extends from the bottom portion of the bottom step support 24 to the inward side of the bottom step 22. Preferably, the bottom step 22 comprises a single sheet of metal bent so a horizontal top portion forms bottom step 22 with an inward side bent downward and outward at an angle to form the bracket 38 having an outer side that is connected to and preferably abuts the lower portion of the bottom step support 24. Two fasteners 40, preferably threaded fasteners, attach outer ends of the bottom step bracket 38 to the lower portion of the bottom support frame 24. The fasteners 36, 40 preferably thread into mating threaded holes 42 (FIG. 3) formed in the walls of the bottom step support 32. The bottom step 22 and/or bracket 38 may be connected to the bottom step support 32 by any desired mechanism, including welding, adhesives, clips, interlocking mechanisms and various threaded fasteners.

As best seen in FIG. 3, the bottom step bracket 38 preferably is not a solid sheet of material extending between the bottom step support 32 and the inward edge of the bottom step 22. A bracket 38 having a solid sheet of material extending below the bottom step 22 would collect debris passing through the bottom step 22. A recess or cutout 44 between the fasteners 40 allows collecting on the downwardly inclined bracket 38 to slide off the bracket before it hits the bottom step support 32.

Figure 2:
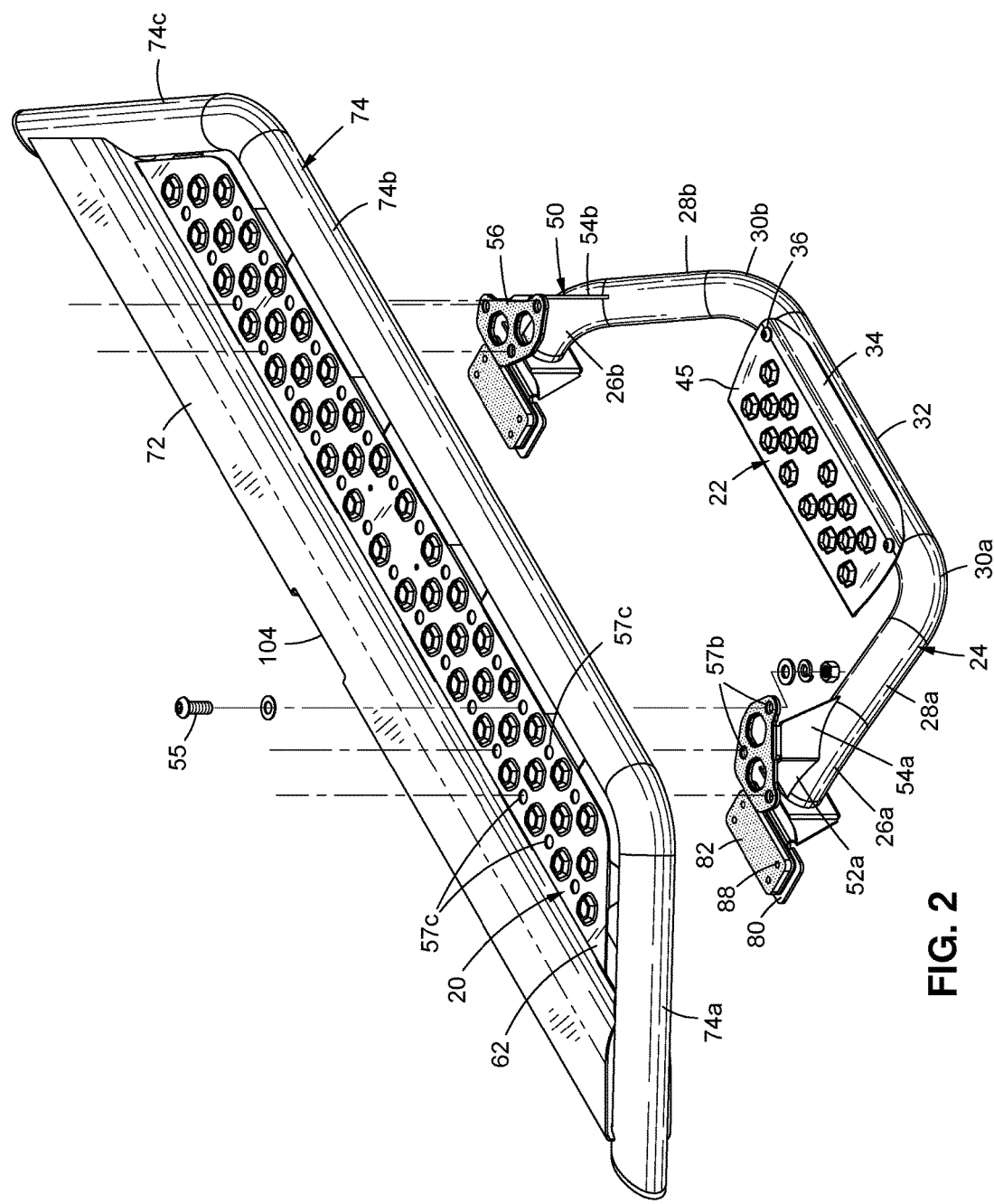
FIG. 2 is a partial exploded perspective view of the side step of FIG. 1.

As seen in FIGS. 2 and 5, the weight of a person stepping on the bottom step 22 will be resisted by the outer side 34 curving over the outer side 34 of the bottom step support 32 along one entire outer side of the bottom step 22 and the fasteners 36 holding that outer side of the step to the bottom step support 32. The inner side of the bottom step 22 is supported by the bottom step bracket 38 and the fasteners 40. Thus, the bottom step 22 is supported by the fasteners 36, 40 and the bottom step bracket 38 and curved side 34.

The bottom step 22 comprises a bottom step plate 45 having a generally rectangular upper surface with a tread pattern preferably formed by perforating the bottom step plate 45 to form hexagonal dimples 46 with sidewalls extending upward and defining hexagonal holes 48 extending through the dimples. The dimples 46, as used herein, are open dimples with a vertical hole through them, as opposed to closed dimples which have a closed top and no vertical passage therethrough, unless expressly stated otherwise. A gage sheet of CRS with hexagonal holes 48 having a distance of about 2 inches between opposing centers of the hexagonal holes, and a bar width of about 0.2 to 0.3 inches are believed preferable. The dimple height is preferable about $1/16$ to $1/8$ inches high, with hexagonal holes about 0.5 inches across parallel flats believed suitable. A finished end pattern is preferred, but an unfinished pattern is believed suitable. A margin around the sides and ends of the step 22 of about 0.2 to 0.4 inches is believed preferable. A staggered hole pattern at about 30° to about 60° is believed suitable, across the entire surface, with a 45° staggered pattern is believed preferable. Advantageously, there are three staggered rows of hexagonal dimples 46

As best seen in FIGS. 2-3, the top step 20 extends parallel to the motor vehicle and is held in position by a top step bracket 50 at each proximal end of the lower step. The top step bracket 50 is connected to each proximal end 26a of the support frame 24, preferable on a top side of each end 26a, 26b and preferably on the portion of the end that curves downward and inward toward the other end 26. The brackets 50 are effectively made the same but orientated in opposing directions so they have mirror-like symmetry to each other.

A bottom edge of the top step bracket 50 is preferably shaped to mate with the top or side of the proximal end 26 of the tubular support frame 26. The top step bracket 50 advantageously includes a flat plate that is bent at an angle generally along two planes generally tracking a curved longitudinal axis through each proximal end 26a, 26b so the bracket 50 has a flat, planar proximal end 52 and a flat, planar distal end 54 both extending vertically in the depicted embodiment but at an angle to each other with each end 52, 54 in a plane that crosses the central axis of the proximal end 26 to which the end 52, 54 is connected. The proximal end 52a of the bracket 50 preferably extends in a plane perpendicular to the side of the vehicle 12 and because the proximal end 26 angles downward and is also inclined slightly toward the other proximal end 26, the plane of the proximal end 52 will cross the centerline through the curved proximal end 26. The distal end 52b of the bracket 50 is angled the opposite direction when viewed from the top and also extends across the curved centerline through the curved proximal end 26. Because the proximal ends 26a, 26b are downwardly inclined and slightly inwardly inclined, the juncture of the curved outer surface of ends 26 with the planar edges of the ends 52, 54 results in a curved edge as best seen in FIG. 3.

The brackets 50a, 50b are each preferably welded to the respective proximal ends 26a, 26b. A gusset 53a (not shown), 53b (shown) in a vertical plane preferably extends outward between the plates 52, 54 with a bottom edge welded to the top of the proximal end 26 and a top edge welded to the bottom side of the top step support 56. As shown in FIG. 3, the vertical bend between adjoining ends 52a, 54a open toward to opposing adjoining ends 52b, 54b. The orientation of the brackets 50a, 50b could be reversed so the vertical bends are closer together and the adjoining ends 52a, 54a open away from the other ends 52b, 54b.

The top edge of each top step bracket 50 is fastened to a top step support 56 which is preferably generally horizontal with a plurality of fastener holes 57a in the support 56 to facilitate connecting the bracket 50 to the top step 20 using various connection mechanisms, such as threaded fasteners. Advantageously, each top step bracket 50 has at least two and preferably three fastener holes 57a for three fasteners 55 (FIG. 2), with the fastener holes located so they do not fall beneath one of the openings 48 during use. The bracket 50 may have one or more openings 58 located to align vertically with openings 48 during use so debris may pass through the aligned holes, and preferably with corresponding shapes as the openings 48.

Referring to FIGS. 3 and 5, a gasket 60, preferably having the shape of top step support 56 is interposed between the top step support and the top step 20, with threaded fasteners 55 passing through fastener holes 57b in the gasket 60 aligned with holes 57a in the top step support 56 and fastener holes 57c in the top step 20 to fasten the parts together using the depicted nuts to tighten the fasteners 55. The gasket 60 is preferably made of rubber or suitable elastomer, but could also comprises a metal gasket acting more as a spacer to adjust the height of the top step 20. The fastener holes 57c in the top step plate 62 are preferably equally spaced apart and interspaced between the hexagonal dimples 46. When the dimples 46 are two inches apart, the fastener holes 57c are also two inches apart. A diameter of about 0.4 inches is believed suitable for the fastener holes 57c but the diameter can vary.

The top step 20 preferably comprises a generally flat, rectangular sheet of material such as a step plate 62, preferably metal, and is shown with tapered, triangular shaped front and rear ends joined by generally straight sides. The top step 20 may have flat edges in the general plane of the top step, but preferably has peripheral edges 64 that are slightly inclined downward at an angle of about 30-45°. The angle will vary with the thickness of the sheet metal used for the top step 20. The inclined peripheral edges 64 help stiffen the top step. The periphery of the step plate 62 is bounded on the inside, toward the vehicle, by running board 72 which extends in a straight line along the side of the vehicle 12, and is bounded on the outside by middle portion 74c of side step member 74, which has inclined front and rear portions 74a, 74c respectively, and side portion 74b generally parallel to running board 72. The side step member 74 is preferably a metal tube, bent to shape or with front and rear ends 74a, 74c cut and welded to the middle portion 74c. A circular cross section is preferred.

At periodic locations along the long sides of the top step plate 62, connecting tabs 68 (FIGS. 1, 6) extend outward to connect the plate to supporting members of a running board 72 extending along a length of the vehicle 12, and connecting the plate to the side step member 74 outward of the running board. The connecting tabs 68 are preferably welded to the adjacent portions of the running board 72 and step member 74. The connecting tabs 68 are typically inclined downward at a shallower angle than the peripheral edge 64 of the top step plate 62.

The top step 20 has a tread pattern formed in a sheet of material, preferably formed by perforating the metal step plate 62 to form hexagonal dimples 46 with sidewalls extending upward and defining hexagonal holes 48, just as in the bottom step 22. The tread construction and tread pattern on the top step 20 and dimples 46 are the same as on the bottom step 22 and that prior description of those parts is incorporated herein by reference.

As best seen in FIGS. 1 and 2, fastener holes 57c in the top step 20 are located between each of the dimples 46 in the row closest to the running board 72, and in the row of dimples closest to the side portion 74b. That results in a fastener hole 57c on opposing lateral sides of each dimple 46 in the center row of dimples and along an axis perpendicular to a plane through the longitudinal axis of the running board 72 or through the longitudinal axis of the side portion 74, both of which are generally parallel. That layout also results in a fastener hole 57c on opposing front and rear sides of each dimple 46 in the row of dimples closest to the running board 72. The hole pattern also places three adjacent holes 57c at the corners of a right triangle with a dimple 46 on two legs of the triangle.

The hole pattern for each fastener hole 57a in each top step support 56a, 56b is a right triangle with an opening 58 (preferably a hexagonal opening) on each leg of the triangle. Thus, the top step supports 56a, 56b can have their holes 57a align with the holes 57c in the top step 20, and the openings 58 align with the hexagonal perforations 48. That hole arrangement allows the top step supports 56a, 56b to be located along the length of the top step 20, with fasteners holding the step supports to the step plate 62. That provides great flexibility in locating the second, bottom step 22 relative to the first, top step 20. The holes 57b in the gasket or spacer 56 also align as described.

The result of the triangular pattern of the fastener holes 57c and 57a is also that the top step support 56 is at a skewed angle relative to the longitudinal axis through the top step 20. The top step support 56 not only spreads the load from the top step 20 to the top step support 56 but the skewed orientation of the support 56 is believed to reduce the localized bending of the top step adjacent the top step support 56. That the fastener holes 57c also allow connection of the top step 20 with the support frame 24 at a variety of locations along the length of the top step and along the length of the running board 72 adds to the flexibility of the connections and the different arrangements that may be achieved in locating the lower step 22 relative to top step 20.

The two, top step supports 56 are unusual as they fasten to the bottom of the top step 20 rather than fastening to a frame holding the top step or instead of fastening to the vehicle itself. Fastening to the generally planar top step 20 provides a connection that is high, and with great flexibility in location. That location also avoids having to drill holes in the vehicle frame or body.

The mounting portions 56 may have a length that is greater than a width, with two openings 58 located along a longitudinal axis 66a for top step support 56a, and along an analogous axis (not shown) for top portion 56b. The openings 58 preferably align with hexagonal openings 48 in the top step 20. The axes 66a preferably inclined at an angle of about 45° relative to the side of the motor vehicle 12, in opposing orientations so that the axes 66a intersect outward from the side of the vehicle 12. The inclined axes 66a causes a skewed orientation of the top step support 56a, 56b that is believed to help reduce twisting of the top step 20 about a longitudinal axis of top step 20, parallel to the vehicle 12. The fastener holes 57a in the top step support 56 are in a triangular pattern to align with fastener holes 57c discussed above and result in a skewed angle connection between the top step support 56 and the top step 20. It is believed that the angled connection of the top step supports 56a, 56b with the top step 20 help avoid twisting of the top step about a single line so that the weight of a person on the top step 20 will not bend the top step primarily along its longitudinal axis nor bend the top step about an axis perpendicular to the running board 72 or side portion 74b, but will instead bend along an inclined axis or axes and thus provide less bending and better support of the top step 20.

As seen in FIGS. 1 and 2, the top step 20 has a periphery that is surrounded on three sides (front, rear and outer side) by side step member 74, and is bounded on the inner, vehicle side by running board 72. Referring to FIGS. 1-5, the side step member 74 is preferably a metal tube and more preferably has a circular cross section. The side step member 74 has a rearwardly and outwardly inclined forward portion 74a, a side portion 74b generally parallel to the side of the motor vehicle and the bottom step support 32, and a rear portion 74c. The front portion 74a is generally straight and inclined outward and rearward at an angle of about 40-60° from the side of the vehicle. When considered from the axis of the side portion 74c the front portion 74a is inclined in a direction that is forward and inward toward the vehicle an angle of about 40-60° relative to the longitudinal axis of the side portion 74b. The front portion 74a and joins the front end of the side portion 74b at a curved juncture. The juncture could be at a sharp angle but the curved juncture is preferred. The side portion 74c joins the rear portion 74c at a curved junction. The juncture could be at a sharp angle but the curved juncture is preferred. The rear portion 74c may be generally straight and is inclined inward toward the vehicle at an angle of about 40-60° from the longitudinal axis of the center portion 74b.

The running board 72 extends along a substantially straight line parallel to the motor vehicle 12 and in the same plane as the side step member 74. The running board 72 extends between and is connected the proximal ends of the front and rear portions 74a, 74c of the side step member 74. The front and rear portions 74a, 74c preferably extend slightly beyond the running board 72 (FIGS. 1, 6) toward the vehicle by an inch or two, and are preferably welded to the running board.

The running board 72 is also connected to proximal end connectors 76a, 76b on opposing proximal ends of the support frame 24. The proximal end connectors 76a, 76b are the same so only one is described. Referring to FIGS. 2, 3 and 5, a proximal end connector 76a connects end 26a to the running board 72 while similarly constructed end connector 76b connects end 26b to the running board at the opposing end of running board. The connectors 76a, 76b are the same construction and the construction can vary. For ease of reference, only connector 76a is described in detail, with 76b having the same construction and corresponding part numbers but with a "b" suffix. The connector 76a has a back wall 78 that is generally vertical during use and to which the proximal end of proximal end 26a is welded. Preferably the proximal end 26a extends initially along an axis perpendicular to back wall 78. The connector 76a connects to the bottom of the running board 72 through a generally horizontal connector plate 80 and optional intervening gaskets or spacers 82, and the connector 76a achieves that change in configuration from the tubular end 26 to the horizontal plate 80.

The back wall 78 may comprise a flat, vertical plate with a lower end bent upwards toward the vehicle to form upwardly inclined front plate 84 that is then bent horizontal to form the connector plate 80. The vertical back wall 78, inclined front wall 84 and horizontal connector plate 80 may thus be bent from a single rectangular plate. A triangular side wall is welded to adjacent edges of the back wall 78 and front inclined wall 84, one at each end of the walls 78, 84, to strengthen the assembly. The two opposing side walls 86, inclined front wall 84 and vertical back wall 78 form a semi-enclosed (and strong) structure with an open top, and preferably with a small opening at the bottom ends for drainage at the bend between back wall 78 and inclined front wall 84. One or more (preferably triangular) gussets 88 have one edge welded to the inclined front wall 84 and another edge welded to the bottom of the connector plate 80 to strengthen the connection.

The connector plate 80 and the gasket and/or spacer 82 each have a plurality of aligned fastener holes 89 (FIG. 3). A threaded fastener 90 (FIG. 5) may extend through the holes 89 to connect the connector plate 80 to the bottom of the running board 72, with the gasket/spacers 82 optionally interposed between the plate 80 and the running board 72. The spacers can adjust the vertical location of the top step plate 62 of the top step 20 relative to the top of the running board 72 and the side step member 74. There are preferably four sets of aligned holes 89 and four threaded fasteners 90 and corresponding nuts 92 to connect each connector plate 80 to the top step plate 62 of top step 22 and hence to the running board 72. Thus, the second, lower step 22 may be connected to the top step 22 by a connection (most anywhere) along the step plate 62.

Referring to FIGS. 1, 2 and 5, the running board 72 and side step member 74 preferably enclose all or a substantial portion of the periphery of the top step 20 and may form part of the top step 20. The running board 72 and side step member 74 are advantageously a controlled distance apart from the peripheral edge 64 of the top step plate 62. The top surface of step plate 62 is advantageous in substantially the same plane as the top edge of the side step member 74, while the top of the dimples 46 in the step plate 62 are preferably in substantially the same plane as the top surface of running board 72 or slightly lower. The top surface of step plate 62 could also be slightly lower than the top. Having the top of the side step member 74 lower than the top of the dimples 46 is believed to help persons enter and leave the vehicle door aligned with the top step 20. As a person steps from the ground (or lower step 22) onto the top step 20, dimples are higher than the side step member 74 and thus more likely to engage the sole of a user's shoe to provide secure traction. As the side step member 74 is preferably a cylindrical tube, it is believed to have much less traction than the dimples 46 and thus it is desirable to have the sole of the user's shoe engage the dimples. Yet the side step member 74 around the outer periphery of the top step is also available to carry that portion of the person's weight as the shoe steps partially on that side step member 74. The relative height of the dimples 46 and side step member 74 are thus believed to help spread the weight of the person using the top step 20, while providing secure traction through the dimples engaging the front portion of a person's shoe sole. That said, the top of the dimples 46 may be above or below the horizontal plane through the top of the side step member 74, and the same applies to the top of the running board 72.

Similarly, as a person steps from the ground onto the lower step 22, the raised dimples 46 extend about the surface of the bottom step plate 45 and engage the sole of the user's shoe to provide secure traction. The support frame 24 is connected to the front part of the lower step 22 and carries the weight of the person using the step 22. The lower step 22 is not encircled by any raised frame that inhibits a user's shoe sole from engaging the raised dimples 46.

Similarly, as a person exits a door of the vehicle and uses the steps 20, 22 aligned with that vehicle door, it is believed that the user's foot will engage the raised dimples 46 on the top step 20, as they extend above the top of the side step member 74 around the outer periphery of the top step. Yet the outer periphery is available to also carry the person's weight as the shoe steps partially on that side step member 74. Likewise, a person stepping down the steps 20, 22 will engage the raised dimples 46 on the bottom step 22, with the weight being efficiently transferred to the frame 24 as the bottom step support 32 supports the front edge of the bottom step.

The side step member 74 and the bottom step support 32 with the curved side 34 of the lower step, provide elongated, straight surfaces that are well suited to scraping mud and debris off a user's shoes. Thus, for example, a user can stand on the ground and scrape mud off one or both shoes using the side of the bottom step support 32 and curved side 34. Alternately, a user can stand on the bottom step 22 and use the side portion 74c (or 74a or 74b) to scrape mud off the user's shoes. The side portion 74b and side support 32 with edge 34 can be used to scrape a shoe regardless of whether the user is facing toward the vehicle or away from the vehicle. The locations of the top of the dimples 46 relative to the top of the side portions 74 and bottom step support 32 can provide secure traction on one foot while a user scrapes the other foot. Alternatively, the raised dimples 46 may be used to aggressive remove mud and debris from a shoe as they provide a raised, irregular surface to such removal.

The relative height of the top of the dimples 46 to the top of the side portion 74 and running board 72 may be adjusted by varying the thickness of the gasket 60. It is believed preferable to have the top of the dimples 46 above a horizontal plane through the top of the side step member 74 by about 1/16 to 3/8 inches, and more preferably about 1/8 inch to 1/4 inch above that horizontal plane.

The dimples 46 are preferably about half an inch between opposing flats of the hexagonal-shaped dimples. For the dimples 46, the holes 48 are preferably about 0.4 to 0.8 inches between the opposing flats, and preferably about 0.5 inches between opposing flats. Those sizes are believed large enough to allow mud or debris from a user's shoe to more easily pass through the dimples. If the openings 48 become much larger, then the plates 45, 62 become weaker and stiffeners or braces or thicker metal must be used at additional cost or weight or complexity. The upper and lower steps 20, 22 are supported so that the area below each step is open or inclined toward an open edge and thus mud and debris does not collect below the steps. The hexagonal shape of dimples 46 is also believed preferable to other shapes as the six substantially straight walls result in six corners that not only form angled beams that stiffen the perforation and plates 45, 62, but make it more likely to have corner unclogged by debris with the unclogged corner allowing increased air flow and better drying and resulting in less adhesion of mud and debris to facilitate natural removal of mud and debris from the hexagonal openings. The flat sides of the dimples are also believed to provide more usable bar widths between dimples 46 and within which to locate fastener holes 57c. The multiple fastener holes 57c provide water drainage between the walls forming dimples 46.

Figure 6:
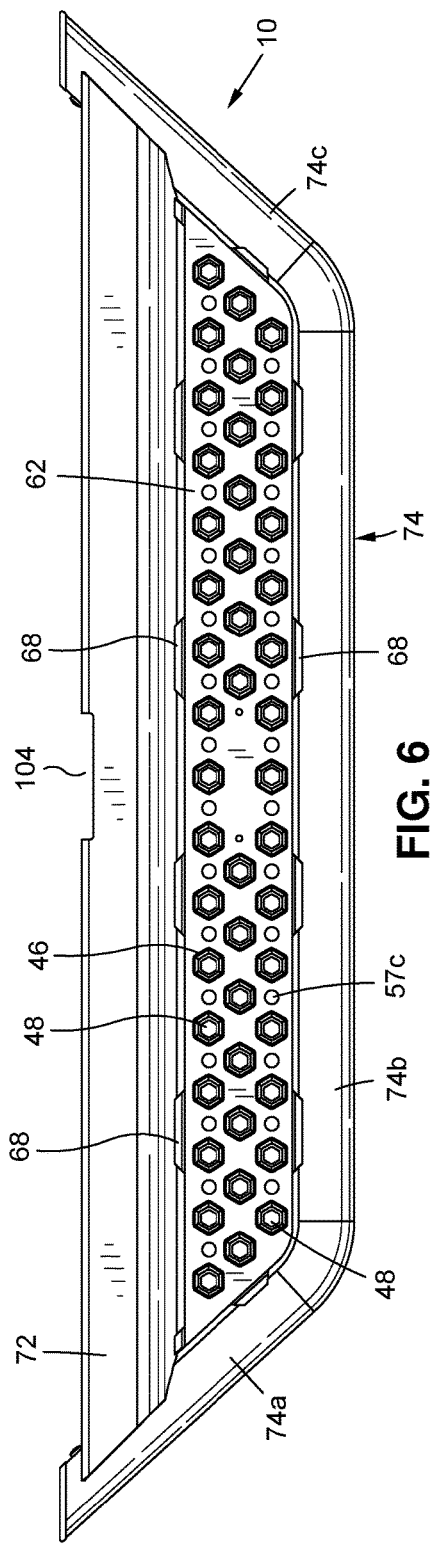
FIG. 6 is a top view of the top step of FIG. 1.

As best seen in FIGS. 1, 2 and 6, the outer peripheral edge 64 of the top step 20 is preferably close to contacting the closest portion of the side step member 74 along at least the middle side portion 74b, and at regularly spaced connecting tabs 68 does connect. Advantageously, the gap between the peripheral edge 64 of top step 20 and the closest wall of the side step member 74 (between tabs 68) is less than about an inch, so a person's shoe or heel will not slip through the gap. The gap between the running board 72 and the adjacent peripheral edge 64 may be larger as the toe or heel of a person's shoe is not likely to enter the gap because it is so close to the vehicle. But a smaller gap of 1/2 inch to 1/4 inch is believed preferable.

Referring to FIGS. 2 and 5-8, the running board 72 also provides a variety of locations for connecting the second step 22 to the first step 20 and the running board so that the second step is not held solely by the fasteners through the aligned holes 56 through the step plate 62 of the first step 20. Mounting the lower step 22 to the step plate 62 forming the tread surface itself is believed to provide great mounting flexibility as numerous fastener holes are available along the length of the top step plate 62 on the top step 20. But if an additional support is desired then a connection mechanism is also desired that allow flexibility in where the parts connect along the length of the running board 72 and top step plate 62.

Figure 7:
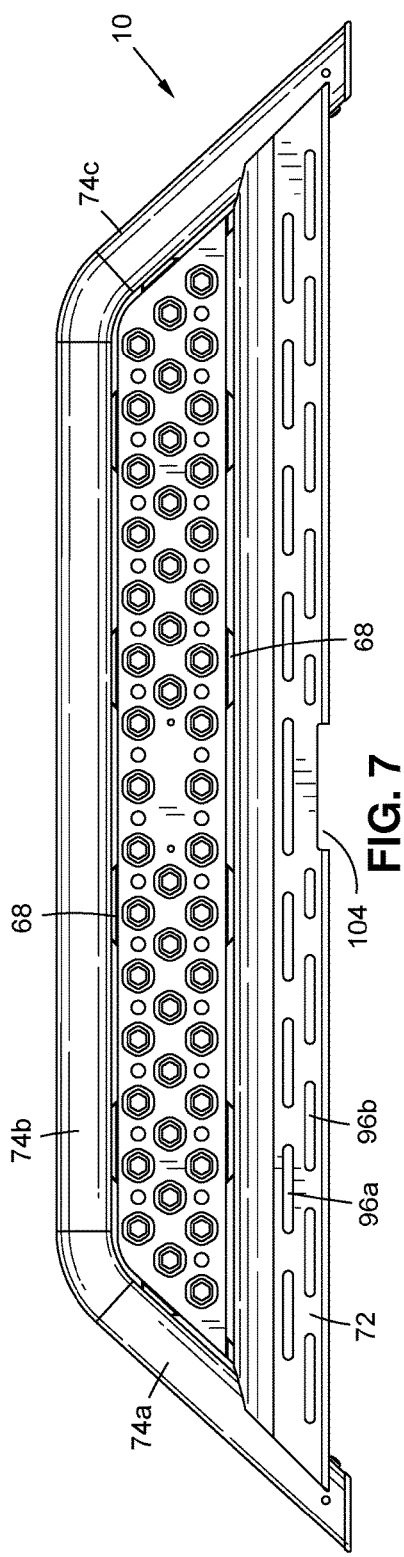
FIG. 7 is a bottom view of the top step of FIG. 6.
Figure 8:
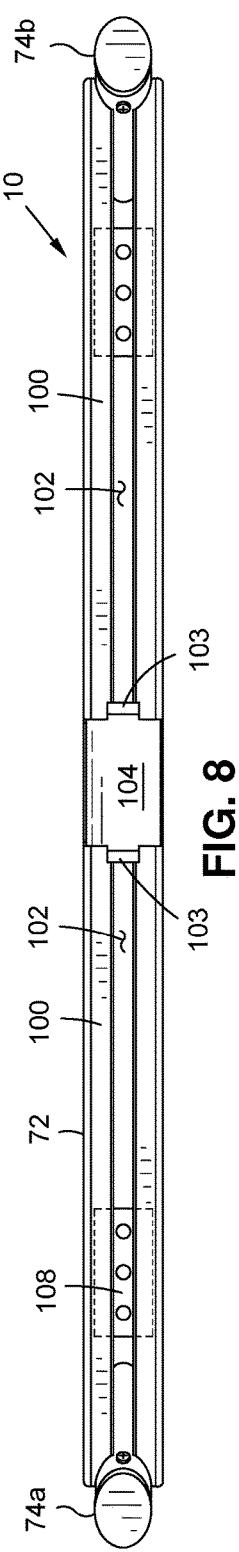
FIG. 8 is view of the inner side of the top step of FIG. 6.

As best seen in FIGS. 5-7, the bottom side of the running board 72 preferably faces in a direction that is vertically downward during use. The bottom side has an elongated, generally rectangular surface with a plurality of closed ended bottom slots 96 (96a, 96b) extending through the running board. The closed ended bottom slots 96 are preferably a few inches long and arranged in two parallel but staggered rows with each row parallel to the length of the running board. The bottom slots 96 in each row are preferably in a staggered arrangement. Thus, a first row of bottom slots 96a, is closer to the step plate 62 and top step 20, while the second row of bottom slots 96b is further from the step plate 62 and top step 20.

The bottom slots 96 are sized to allow the threaded fasteners 90 to just pass between opposing sides of each slot. The two rows of bottom slots 96a, 96b are spaced apart a distance corresponding to the fastener holes in the connector plate 80. In use, the holes 57c in the top step 20 are aligned with the holes 57a in the top step supports 56a, 56b so fasteners 55 can hold the parts together, and that alignment should also align the holes 89 (FIG. 3) with the slots 96a, 96b so fasteners 90 and nuts 92 (FIG. 5) can pass through the parts to connect the connector plate 80 with the bottom of the running board 72. The bottom slots 96 thus provide a long length along the running board 72 along which the second, lower step 22 and its support frame 24 may be connected. That provides great flexibility of location and ease of aligning the parts for connection.

As seen in FIG. 5, the lower step 22 is supported by connecting the proximal end of the support frame 24 to the bottom of the running board 72, while connecting another portion of the proximal end of the support frame to the step plate 62 of the top step 20, which is also connected to the running board 72. The connection to the step plate 62 on the top step 20 is above and outward of the connection to the lower portion of the running board 72, and those offset connections are believed to provide a more stable support for both the upper step 20 and for the lower step 22. As discussed above, the bottom slots 96 and aligned holes 57 in the respective parts make it easier to align and connect the parts used for this sturdy, offset connection to the running board.

The configuration and locations of the vehicle mounting brackets will vary with the vehicle 12 to which the running board 72 and one or more of the steps 10, 20 are connected. The running board 72 provides a surprising ease of connection to the frame and/or body of the vehicle 12. Referring to FIGS. 5-10, the back side 100 of the running board 72 faces in a direction toward the vehicle 12 during use and has two flanges extending toward each other to form a back slot 102, each slot preferably running less than a majority of the length of the running board. Each back side 100 preferably has one end welded to side step member 74 either front portion 74*a* or rear portion 74*c*. The interior ends of the side 100 are preferably joined by a vertical support 103 (FIG. 8) welded to each flange of the back side 100 to form elongated back slot 102 between the opposing top and bottom portions of back side 100, with one back slot 102 extending toward the front end of the running board 72 and another back slot 102 extending toward the rear end of the running board.

Between the vertical supports 103 is a preferably rectangular, back opening 104 preferably extending the full height of the running board 100. The back opening 104 is preferably only a few inches long, long enough allow entry of insert 108 as discussed later. The back slot 102 may be sized to allow portions of vehicle mounting brackets to pass between the sides of the back slot 102 and then rotated 90° so threaded holes in the inserts can be aligned with the back slot and so that brackets can be bolted to the inserts using fasteners passing through back slots 102 in the back side 100 of the running board 72. The back opening 104 preferably extends across a substantial portion of the vertical height of the back 100 to allow vehicle mounting brackets to be inserted through the back opening 104 and slid along a length of the running board to position the mounting brackets relative to the running board before bolting, welding or otherwise fastening the bracket to the back 100 and running board 72. The back opening 104 is shown at the center of the length of the running board and rectangular in shape, but other locations can be used and other shapes can be used. For example, FIG. 13 indicates three back openings 104 equally spaced along the length of the running board 72.

Through the back slot 102 and the back opening 104, various shapes of inserts 108 can be inserted inside the running board 72 through either slot 100 or back opening 104 so the vehicle mounting brackets can be connected to the running board 72. As needed, the inserts 108 are rotated or slid into positioned along the length of the running board 72, and then bolted through aligned holes in the vehicle mounting bracket and the back side 100, or otherwise fastened together using fasteners.

The configuration of the vehicle mounting brackets 106 will vary with the vehicle involved, but the vehicle mounting brackets 106 typically connect to an insert 108 configured to fit inside the running board 72. The brackets 106 have a base 109 that cooperates with the insert 108 to clamp the mounting bracket 106 to the vehicle. The brackets 106 also have a vehicle connecting plate 110 configured to fasten to the vehicle body and/or frame, and preferably have a middle portion extending between the base 108 and vehicle connecting plate.

One illustrative vehicle mounting bracket 106 is shown in FIG. 9. The brackets 106 are typically metal, preferably steel. The insert 108 comprises a rectangular plate with threaded holes 116*a*, or a plate with an L-shaped cross-section with threaded holes on one leg of the L-shaped cross-section. The plate is sized to fit through back slot 102 in the back 100 of the running board and be rotated into an orientation parallel to the back 100 and then slid along back slot 102 into position. The L-shaped cross-section allows the insert 108 to support itself easier without tipping over if one leg of the L-shaped cross section is on the bottom. Alternatively, the insert 108 could also be slid axially through the back opening 104 and slid into position along the back slot 102 on either side of the back opening 104. Depending on the configuration of the insert 108, the leg of the L-shaped cross section may be at the top or bottom.

The depicted base 109 comprises a rectangular plate with fastener holes 116*b* aligned with the holes 116*a* so that fasteners 111 can clamp the insert 108 and base 109 toward opposing sides of the back 100 of the running board 72. The depicted base 109 has two fasteners 111 aligned in a row along the length of back slot 102, but more could be provided on the opposite side of the middle portion 112, in the base 109. The clamping of the back 100 between the insert 108 and base 109 not only connects the base 109 to the running board 72, but provide a localized stiffness and strength to the clamped portion of the back 100 and the running board.

The middle portion 112 is shown as a plate in a plane perpendicular to the plane of the base 109 and perpendicular to the longitudinal axis of the running board. The vehicle connecting plate 110 comprises two separate plates 110 each generally perpendicular to the plane of the middle portion and inclined to abut a portion of the body of the vehicle 12. More connecting plates 110 could be provided on the opposite side of the middle portion 112, as desired and depending on the vehicle. Each vehicle connecting plate 110 has a threaded hole through which a threaded fastener 118 passes the connect the plate 110 and vehicle mounting bracket 106 to the vehicle body or frame. The number, shape and location of the vehicle connecting plates 110 will vary with the vehicle 12. The vehicle mounting bracket 106 typically is at a location set by the vehicle manufacturer, but the ability to move the insert 108 along the length of the running board allows the running board to be positioned relative to the vehicle body. Thus, the running board 72 can be positioned at various locations along the bottom side of the vehicle.

Referring to FIG. 10, another variation of a vehicle mounting bracket 6 is shown. The insert 108 comprises a rectangular plate with an L-shaped cross section and with threaded holes 116*a* located to be accessible through the back slot 102. The base 109 comprises a generally rectangular plate with a wide, T-shape, and with the stem of the T extending downward. A fastener 111 extends through a hole in each bottom corner of the base 109 to fasten to the insert 108 and clamp the insert and base together with the back side 100 between the clamping parts as previously described. The vehicle connecting plate 110 has two vertical plates each in a different plane offset laterally from each other, with a middle portion 112 connecting those two plates. A lower portion of the vehicle connecting plate 110 comprises an upper portion of the base 109, with fasteners 118 in the upper corners of the T shaped plate. Thus, one flat plate has fasteners 111 and fasteners 118, connecting the plate to both the vehicle body 12 and the running board 72.

The upper portion of the vehicle connecting plate 110 comprises a generally rectangular plate located above, and offset inward of the lower portion described above. The upper portion of the vehicle connecting plate 110 also has two fasteners 118 connecting the plate to the vehicle body or frame. A laterally extending plate connects the upper and lower portions of the vehicle connecting plate 110 in this variation. The middle portion 112 comprises a vertical plate in a plane perpendicular to the longitudinal axis of the running board 72, with one end welded between the fasteners 111 on the lower portion of the base, and the other end welded between the fasteners 118 on the upper portion of the vehicle connecting plate 110. As reflected by FIGS. 9 and 10, the configuration of the vehicle mounting bracket will vary with the vehicle manufacturer and with the vehicle 12.

Referring to FIG. 11, a protective cover plate 120 may be optionally provided for the top step plate 62. The protective cover plate 120 preferably has the same peripheral shape as step plate 62, with slightly larger dimples 46 at the same locations as those in step plate 62, and with fastener holes 57c at the same locations and the same sizes as those in step plate 62. The protective cover plate 120 may nest with the top step plate 62. The protective cover 120 may be held to the step plate 62 by threaded fasteners 118, such as nuts and bolts extending through the fastener holes 57, to removably connect the cover plate 120 to the top step plate 62.

The protective cover plate 120 may be made of stainless steel, or high density polyurethane, or other suitable plastic material. The protective cover plate 120 may be decorative in appearance to vary the appearance, color or texture of the top step 20 relative to the encircling running board 72 and side step member 72. Thus, the cover plate 120 may be silver or chrome in color while the running board 72 and side step member 72 are dark (e.g., black) or have the same color as the adjacent portion of vehicle 12.

Figure 12:
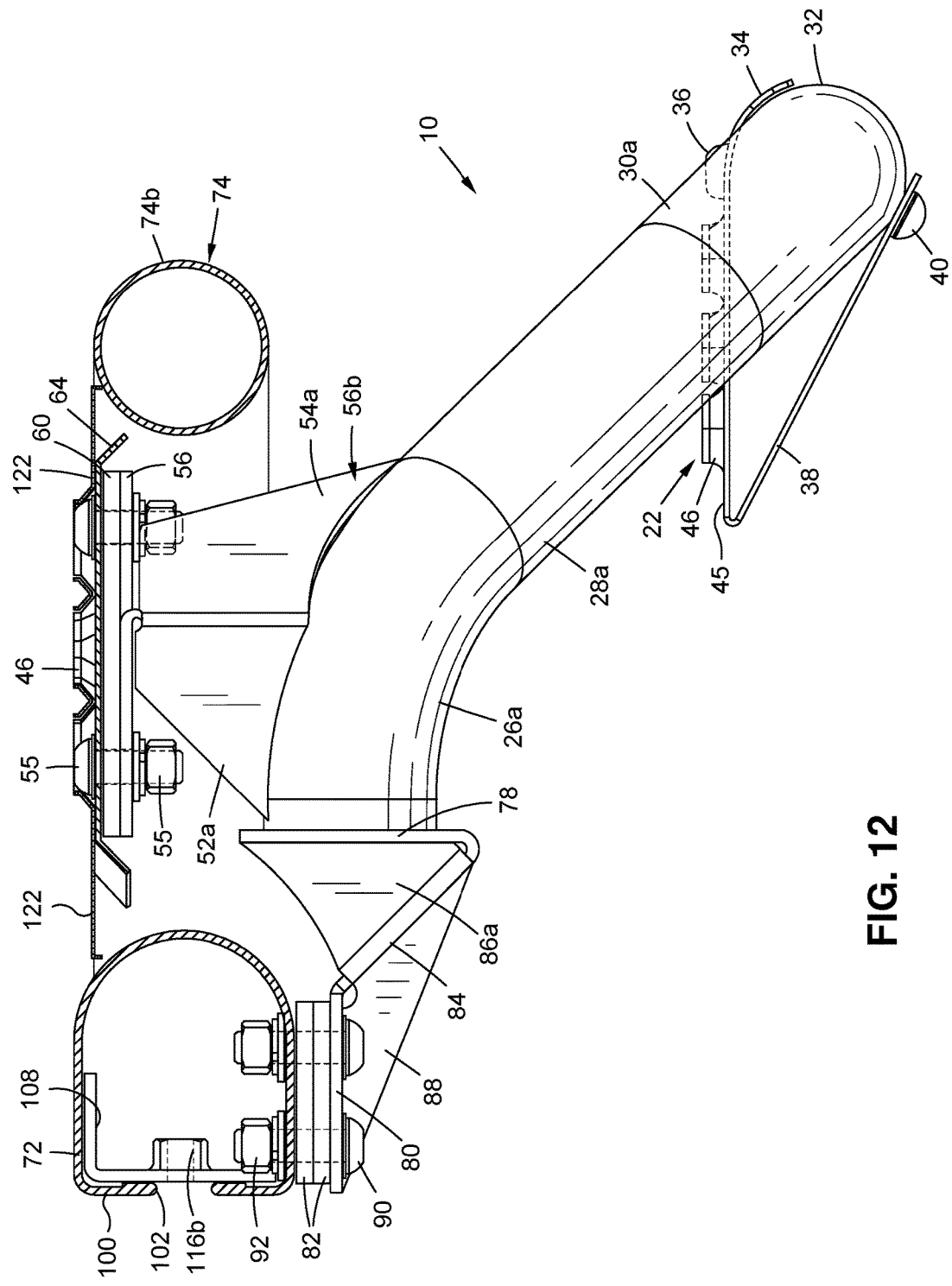
FIG. 12 is a sectional view along the same section as FIG. 5, but showing a larger top cover in cross-section.

Referring to FIG. 12, a further protective cover plate 122 is shown in cross-section where the cover plate extends into contact with the adjacent portions of the running board 72 and the side step member 74, and at least the side step portion 74b, and preferably side step portions 74a, 74c. In this further variation, the protective cover plate 122 is sufficiently strong to withstand a person's weight on the protective cover plate 122 and not break or permanently deform. The strength is usually not an issue for the portion of cover plate 122 contacting the top step plate 62, but the depicted cover plate 122 preferably extends between the lateral supporting edges of the top step plate 62 and the adjacent portions of the running board 72 and side step member 74 and that portion should be strong enough to support the weight of persons using the top step 20. The outer periphery of the cover plate 122 may be spot welded at various locations to the running board 72 and side step member 74 and bolted by threaded fasteners 55, or simply held by fasteners 55. A downwardly extending stiffening flange may be provided around the periphery. Other connection mechanisms known in the art may also be used.

Referring to FIGS. 8-12 and especially FIGS. 11-12, an insert 108 is shown inside the running board 72. The insert 108 has threaded a threaded nut or adhered to the insert forming threaded hole 116b to receive threaded fasteners 111 (FIGS. 9-10). The inserts 108 have an L-shaped cross section, but in this variation both legs of the L-shaped cross-section are sized to fit through the back opening 104, either because the back opening 104 has a longitudinal length sufficient to allow the insertion, or because the size of the insert 108, back opening 104 and the depth of the running board 72 will allow that insertion. Stiffening gussets (FIG. 11) are located between threaded holes. One leg of the L-shaped cross-section is on the top, and the length of the legs maybe the same.

Figure 13:
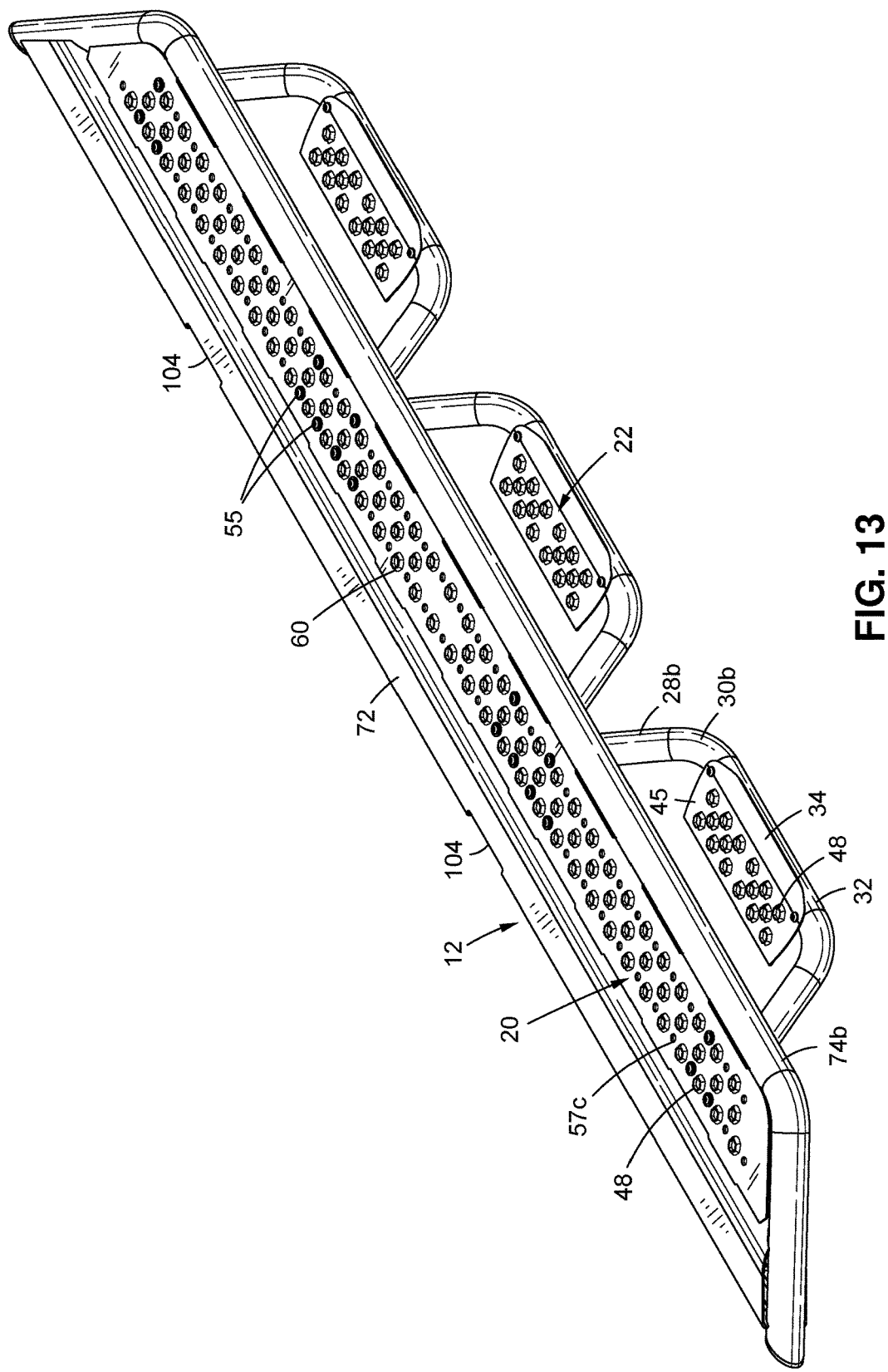
FIG. 13 is a perspective view of a side step with three lower steps.

As shown in FIG. 13, more than one lower step 22 may be connected to the top step 20 and running board 72, and the top step 20 may have various lengths and be located at various positions along the length of the side of the motor vehicle 12. Moreover, each lower step 22 may be connected at various locations along the length of the running board 72 and top step 20. Typically, the number of lower steps 22 is limited to just a few in number, with 1-3 steps being most common, as the steps are often aligned with doors to the vehicle 12.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of configuring the vehicle mounting brackets 106 to connect the running board 72 with the vehicle 12. The vertical supports 103 forming back opening 104 could be repeated so there are plural openings 104, and preferably two or three openings 104. The vertical supports 103 may strengthen the running board 72 by joining opposing sides of the back side 100, even though the larger vertical opening 102 weakens the back side. Further, the various features of this invention can be used alone, or in varying combinations with each other and are not intended to be limited to the specific combination described herein. Thus, the invention is not to be limited by the illustrated embodiments.

What is claimed is:

1. A side step for a motor vehicle having a frame and vehicle body, comprising:
    a metal running board extending along a first longitudinal axis, the running board having a front end and an opposing rear end and further having a bottom side facing downward toward the ground during use, the bottom side having first and second parallel rows of elongated, closed ended bottom slots, each bottom slot extending along an axis parallel to the first axis, the bottom slots in the first row being staggered with respect to the bottom slots in the second row;
    a tubular, metal, side step member having a front portion connected to the front end of the running board and having a rear end connected to the rear end of the running board;
    a top step plate extending between and connected to the middle portion of the tubular side step member on opposing sides of the top step plate; and
wherein the top step plate has a plurality of outwardly extending tabs along opposing sides of the top step plate, the plurality of tabs also extending downward to connect to the running board.

2. The side step of claim 1, wherein the top step plate has first and second rows of dimples with each row parallel to the first axis, each row also having fastener holes between a majority of the dimples in each row, the first row of dimples and fastener holes being closer to the running board than the second row.

3. The side step of claim 2, wherein the dimples are hexagonal in shape.

4. The side step of claim 1, wherein the top step plate has a plurality of outwardly extending tabs along opposing sides of the top step plate, the plurality of tabs also extending downward to connect to the running board.

5. A side step for a motor vehicle having a frame and vehicle body, comprising:
    a metal running board extending along a first longitudinal axis, the running board having a front end and an opposing rear end and further having a bottom side facing downward toward the ground during use, the bottom side having first and second parallel rows of elongated, closed ended bottom slots, each bottom slot extending along an axis parallel to the first axis, the bottom slots in the first row being staggered with respect to the bottom slots in the second row;

a tubular, metal, side step member having a front portion connected to the front end of the running board and having a rear end connected to the rear end of the running board;

a top step plate extending between and connected to the middle portion of the tubular side step member on opposing sides of the top step plate; and further comprising:

first and second inserts, each located inside the running board and movable along a portion of a length the running board; and first and second vehicle mounting brackets each having at least one vehicle connecting plate with a fastener hole therethrough, a base with at least one fastener hole passing therethrough, and a middle portion connecting the base to the vehicle connecting plate;

a back slot in the running board, the back slot parallel to the first axis and extending along a length of the back side; and a plurality of first threaded fasteners passing through the back slot and connecting the first base to the first insert, and a plurality of second threaded fasteners passing through the back slot and connecting the second base to the second insert.

6. The side step of claim 1, further comprising:

first and second inserts, each located inside the running board and movable along a portion of a length the running board; and first and second vehicle mounting brackets each having at least one vehicle connecting plate with a fastener hole therethrough, a base with at least one fastener hole passing therethrough, and a middle portion connecting the base to the vehicle connecting plate; and a plurality of first threaded fasteners passing through the back slot and connecting the first base to the first insert, and a plurality of second threaded fasteners passing through the back slot and connecting the second base to the second insert.

7. The side step of claim 5, wherein the first and second vehicle connecting plates are fastened to a motor vehicle.

8. The side step of claim 6, wherein the first and second vehicle connecting plates are fastened to a motor vehicle.

9. A side step for a motor vehicle having a frame and vehicle body, comprising:

a metal running board extending along a first longitudinal axis, the running board having a front end and an opposing rear end and further having a bottom side facing downward toward the ground during use, the bottom side having first and second parallel rows of elongated, closed ended bottom slots, each bottom slot extending along an axis parallel to the first axis, the bottom slots in the first row being staggered with respect to the bottom slots in the second row;

a tubular, metal, side step member having a front portion connected to the front end of the running board and having a rear end connected to the rear end of the running board;

a top step plate extending between and connected to the middle portion of the tubular side step member on opposing sides of the top step plate; and further comprising:

a lower step support frame having first and second connector plates each having both first and second fastener holes therethrough located to align with respective first and second rows of the bottom slots, the connector plates being orientated to connect to the bottom side of the running board during use, with different ones of a third plurality of threaded fasteners passing through the first and second rows of bottom slots and first and second fastener holes in the first and second connector plates to fasten the connector plates to the bottom side of the running board;

a lower step support frame having a first and second proximal ends connected to the first and second connector plates, respectively, each proximal end connected to an opposing end of a bottom step support located a predetermined distance outward from the and below the connector plates during use;

a lower step plate having opposing first and second sides with the first side connected to a first, upper portion of the lower step support and the second side connected to a second, lower portion of the lower step support;

first and second top step supports each connected to a respective one of the first and second proximal ends, the top step supports located above the connector plates during use, in a generally horizontal plane;

a fourth plurality of threaded fasteners, different ones of which pass through one of the fastener holes in the top step plate and a corresponding fastener hole in one of the first and second top step supports to connect the top step supports to the bottom of the top step plate.

10. The side step of claim 6, further comprising:

a lower step support frame having first and second connector plates each having both first and second fastener holes therethrough located to align with respective first and second rows of bottom slots, the connector plates being orientated to connect to the bottom side of the running board during use, with different ones of a third plurality of threaded fasteners passing through the first and second rows of bottom slots and first and second fastener holes in the first and second connector plates to fasten the connector plates to the bottom side of the running board;

a lower step support frame having a first and second proximal ends connected to the first and second connector plates, respectively, each proximal end connected to an opposing end of a bottom step support located a predetermined distance outward from the and below the connector plates during use;

a lower step plate having opposing first and second sides with the first side connected to a first, upper portion of the lower step support and the second side connected to a second, lower portion of the lower step support;

first and second top step supports each connected to a respective one of the first and second proximal ends, the top step supports located above the connector plates during use, in a generally horizontal plane;

a fourth plurality of threaded fasteners, different ones of which pass through one of the fastener holes in the top step plate and a corresponding fastener hole in one of the first and second top step supports to connect the top step supports to the bottom of the top step plate.

11. A side step for a motor vehicle having a frame and vehicle body, comprising:

a metal running board extending along a first longitudinal axis, the running board having a front end and an opposing rear end and further having a bottom side facing downward toward the ground during use, the bottom side having first and second parallel rows of elongated, closed ended bottom slots, each bottom slot extending along an axis parallel to the first axis, the bottom slots in the first row being staggered with respect to the bottom slots in the second row;

a tubular, metal, side step member having a front portion connected to the front end of the running board and having a rear end connected to the rear end of the running board;

a top step plate extending between and connected to the middle portion of the tubular side step member on opposing sides of the top step plate; and further comprising a back slot in the running board, the back slot parallel to the first axis and extending along a length of the back side;

wherein the back slot comprises first and second, closed ended back slots, each extending from adjacent an enlarged opening in the back plate toward a different end of the back plate.

12. A side step for a motor vehicle having a frame and vehicle body, comprising:

a metal running board extending along a first longitudinal axis, the running board having a front end and an opposing rear end and further having a bottom side facing downward toward the ground during use, the bottom side having first and second parallel rows of elongated, closed ended, bottom slots, each bottom slot extending along an axis parallel to the first axis, the bottom slots in the first row being staggered with respect to the bottom slots in the second row;

a tubular, metal, side step member having a middle portion parallel to the first axis and a front portion connected to the front end of the running board and having a rear end connected to the rear end of the running board;

a top step plate extending between the running board and connected to the middle portion of the tubular side step member; and further comprising:

a back side of the running board, the back side having an enlarged opening through the back side with first and second, closed ended back slots each parallel to the first axis and extending from adjacent the enlarged opening toward an opposing end of the back side;

first and second inserts, each located inside the running board and sized to pass through either the enlarged opening or one of the first and second back slots;

first and second vehicle mounting brackets each having at least one vehicle connecting plate with a fastener hole therethrough, a base connected to a respective one of the first and second inserts using threaded fasteners passing through one of the first and second back slots, each vehicle mounting bracket further having a middle portion connecting the base to the vehicle connecting plate.

13. The side step of claim 12, a lower step support frame having first and second connector plates each connected to the bottom of the running board by threaded fasteners passing through the bottom slots in the running board;

a lower step support frame having first and second proximal ends connected to the first and second connector plates, respectively, each proximal end connected to an opposing end of a bottom step support located a predetermined distance outward from the and below the connector plates during use;

a lower, horizontal step plate connected to the lower step support; and first and second top step supports connected to the first and second proximal ends, respectively, and located above the connector plates during use, in a generally horizontal plane, each of the first and second step supports connected to a bottom of the top step plate;

wherein threaded fasteners pass through different ones of the first fastener holes in the top step plate connect the first and second top step supports to the top step plate.

\* \* \* \* \*